(No Model.)
L. VAN ALSTYNE.
LEVEL.
No. 287,342. Patented Oct. 23, 1883.
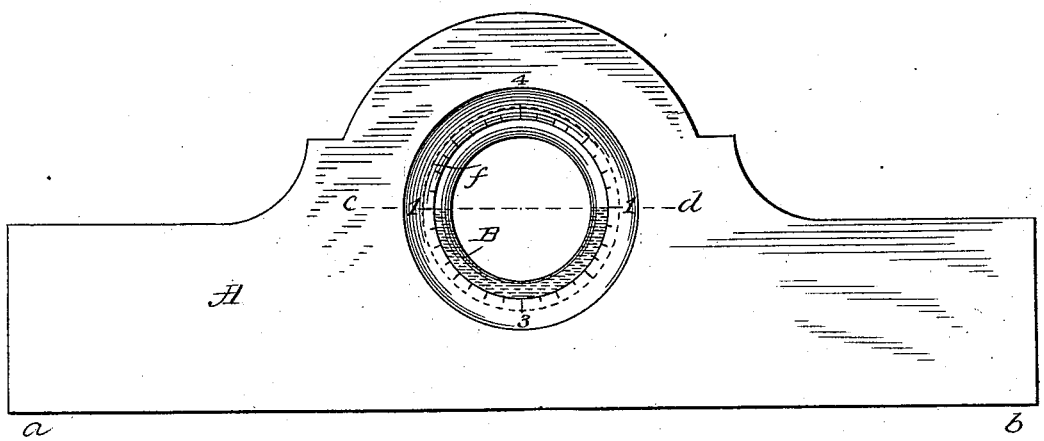
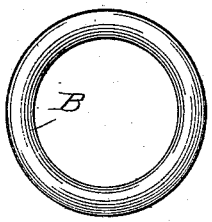
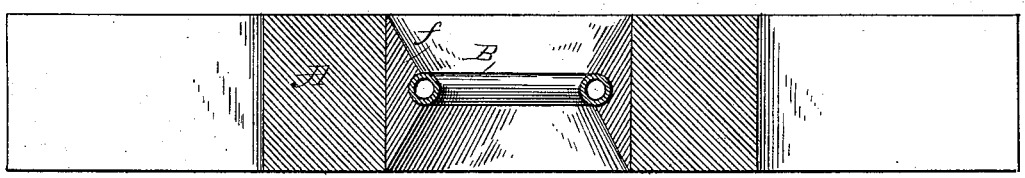
Attest:
Walter Donaldson
L. W. Lury
Inventor
Lawrence Van Alstyne
by Joyce & Spear
Attys.

UNITED STATES PATENT OFFICE.

LAWRENCE VAN ALSTYNE, OF SHARON, CONNECTICUT.

LEVEL.

SPECIFICATION forming part of Letters Patent No. 287,342, dated October 23, 1883.

Application filed August 25, 1883. (No model)

*To all whom it may concern:*

Be it known that I, LAWRENCE VAN ALSTYNE, of Sharon, in the county of Litchfield and State of Connecticut, have invented a new and useful Improvement in Carpenters' Levels; and I do hereby declare that the following is a full, clear, and exact description of the same.

My invention relates to carpenters' levels; and it is designed as an improvement upon that class of carpenters' levels which consist of a straight stock or bar having a slightly-curved glass tube filled ordinarily with spirits or some equivalent liquid. These instruments as ordinarily made are adapted to be used only upon horizontal surfaces, or upon horizontal or vertical surfaces, if a tube, &c., be added also at the end of the bar or stock. An attempt has been made to enlarge the capacity of this instrument by the use of a hollow disk half filled with liquid, but so far as I know this has not been found practicable, by reason of the difficulty in hermetically sealing the glass vessel of this sort, and for other reasons which will be obvious to those skilled in the art. I have sought to obtain the same arrangement of instrument without incurring these objections.

My improved instrument is designed to indicate a horizontal line, whether upon the upper or under surface, and also to indicate with equal facility and accuracy any angle of inclination therefrom. It consists of an annular tube, of glass, half filled with any suitable liquid, and fitted in a round opening of a straight stock or bar, with the inner edge or periphery of the tube exposed to view, and provided with a graduated scale of degrees.

The invention is shown in the accompanying drawings, in which Figure 1 is a side elevation of the instrument, and Fig. 2 a side elevation of the tube detached. Fig. 3 is a horizontal section through the center of the annular tube.

In these drawings, A represents the stock or bar, the edge *a b* of which is straight. The opposite side is made also preferably straight and parallel with the said *a b*, except at the center, where it is cut, to complete the circle which incloses the hollow tube B. This tube B is preferably circular in cross-section, and it is set in an annular cavity adapted to receive it, the cavity being formed in the wood of the bar or of any suitable plastic material, *f*, so as to hold the ring securely in place, and to cover only so much of the outer edge as shall be necessary for this secure holding. As hereinbefore stated, the liquid should be exactly sufficient to fill one-half of the cavity of the tube, so that when the tube is set and the instrument is on level surface, the liquid may rise on both sides to the marks 1 1, which are in the line *c d*, dividing the ring into two equal parts and exactly parallel with the edge *a b*. From these points 1 1 the tube is graduated to the point 3, which is equally distant from points 1 1. The tube may be also graduated from the points 1 1 to the point 4 exactly opposite the point 3.

It will be apparent that when the instrument is set upon a horizontal surface the liquid will stand upon both sides at the points 1 1. Any variation from the horizontal surface will be indicated in degrees and parts of degrees on the graduated quadrants of the tube. When the straight edge *a b* is placed against a vertical surface, the line of the liquid surface will coincide with the line 3 4.

It will be obvious that the instrument may be inverted, and may be placed with equal effect against an upper surface. Obviously the distance between two surfaces in the tube gives greater accuracy and clearness of observation than the single bubble of the ordinary level.

In order to lessen the rising of the liquid in the tube from capillary attraction, I use, preferably, a small tube.

I am aware that disk-shaped glass set flatwise in a stock or bar is not new; and I am also aware that annular tubes with floats without a stock or bar have been devised as sight-levels, as in English Patent No. 1,555, of 1860. I am also aware that an annular cavity made in the face of the stock and covered with glass, showing a liquid surface at two points, is not new. I limit my claim in view of the admitted state of the art.

I claim—

A carpenter's level consisting of a bar or stock having a transverse opening through it, an annular tube half filled with a suitable liquid set in the inner surface of the opening and partially exposed, so as to show the liquid on both sides of the stock.

In testimony whereof I have signed my name to this specification in the presence of two subscribing witnesses.

LAWRENCE VAN ALSTYNE.

Witnesses:
 L. W. SEELY,
 WALTER DONALDSON.